United States Patent [19]
Musket

[11] Patent Number: 5,477,636
[45] Date of Patent: Dec. 26, 1995

[54] PREASSEMBLED GLUE TRAP

[75] Inventor: David C. Musket, Kutztown, Pa.

[73] Assignee: Woodstream Corporation, Lititz, Pa.

[21] Appl. No.: 380,133

[22] Filed: Jan. 26, 1995

Related U.S. Application Data

[63] Continuation of Ser. No. 136,460, Oct. 15, 1993, abandoned.

[51] Int. Cl.$^6$ ................................................. A01M 1/14
[52] U.S. Cl. ................................................................ 43/114
[58] Field of Search ............................... 43/107, 114, 58

[56] References Cited

U.S. PATENT DOCUMENTS

| | | |
|---|---|---|
| 393,273 | 11/1888 | Thum . |
| 469,021 | 2/1892 | Smith . |
| 793,871 | 7/1905 | Bien . |
| 1,221,785 | 4/1917 | Williams ................................... 43/114 |
| 1,411,931 | 4/1922 | Pfeiffer, Sr. . |
| 3,023,539 | 3/1962 | Emerson .................................. 43/114 |
| 3,304,646 | 2/1967 | Staley . |
| 3,343,744 | 9/1967 | Morell ...................................... 43/58 |
| 3,398,478 | 8/1968 | Pearsall . |
| 3,913,259 | 10/1975 | Nishimura et al. . |
| 4,103,448 | 8/1978 | Souza . |
| 4,244,134 | 1/1981 | Otterson .................................. 43/114 |
| 4,385,465 | 5/1983 | Palmeri . |
| 4,395,842 | 8/1983 | Margulies ................................ 43/114 |
| 4,425,731 | 1/1984 | Orlando . |
| 4,485,581 | 12/1984 | Roccaforte ............................... 43/114 |
| 5,048,224 | 9/1991 | Frisch . |

*Primary Examiner*—Kurt Rowan
*Attorney, Agent, or Firm*—Jacobson, Price, Holman & Stern

[57] ABSTRACT

A preassembled glue trap for rodents forms its own packaging thereby dispensing with the need for an outer wrapper or box. The trap package is in the form of a tunnel-like structure with closed ends formed from a folded blank of paperboard or like stock. Each end wall of the structure is provided with a push-in or tear-out panel which forms an access opening to the tunnel when the package is to be converted for use as a trap.

13 Claims, 5 Drawing Sheets

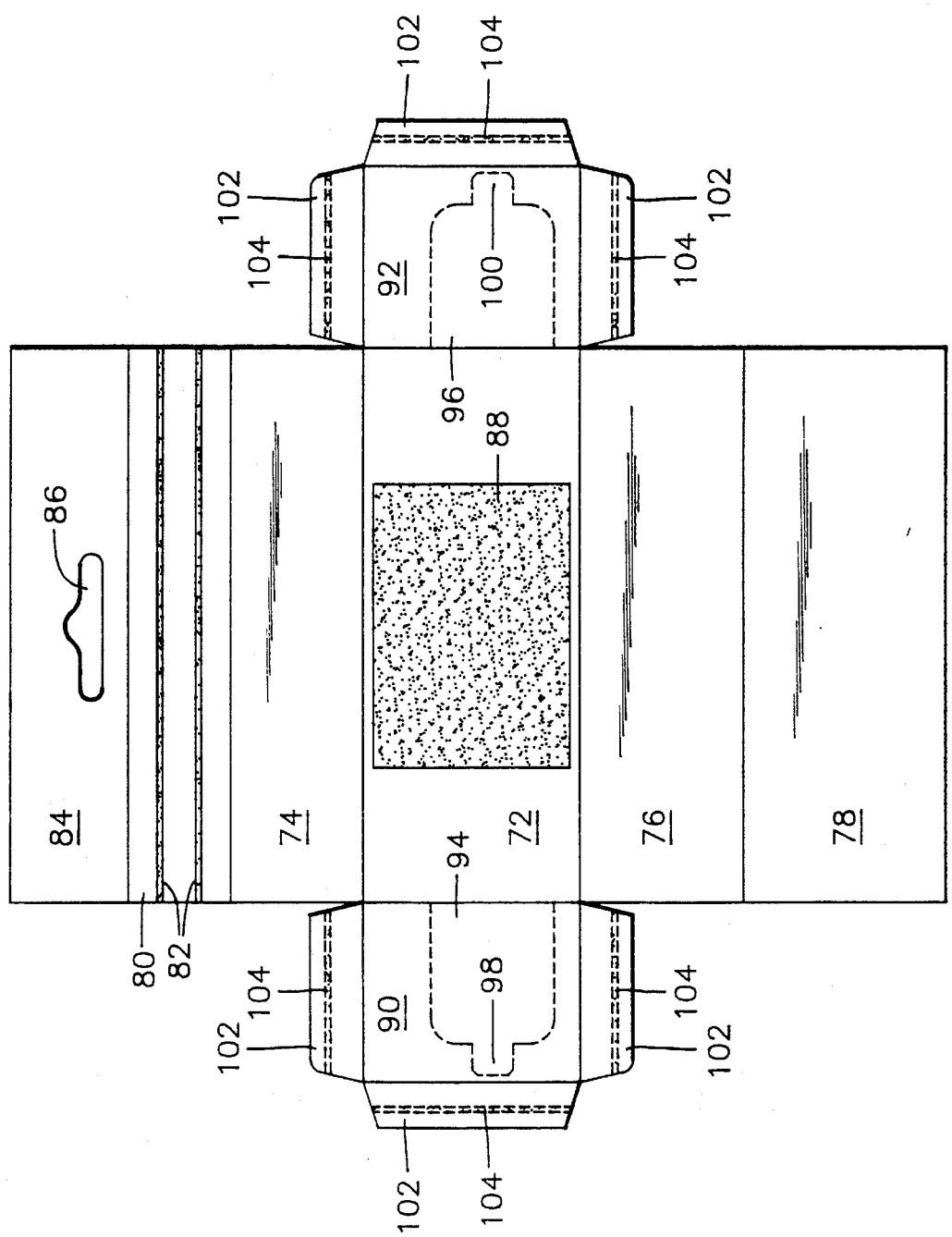

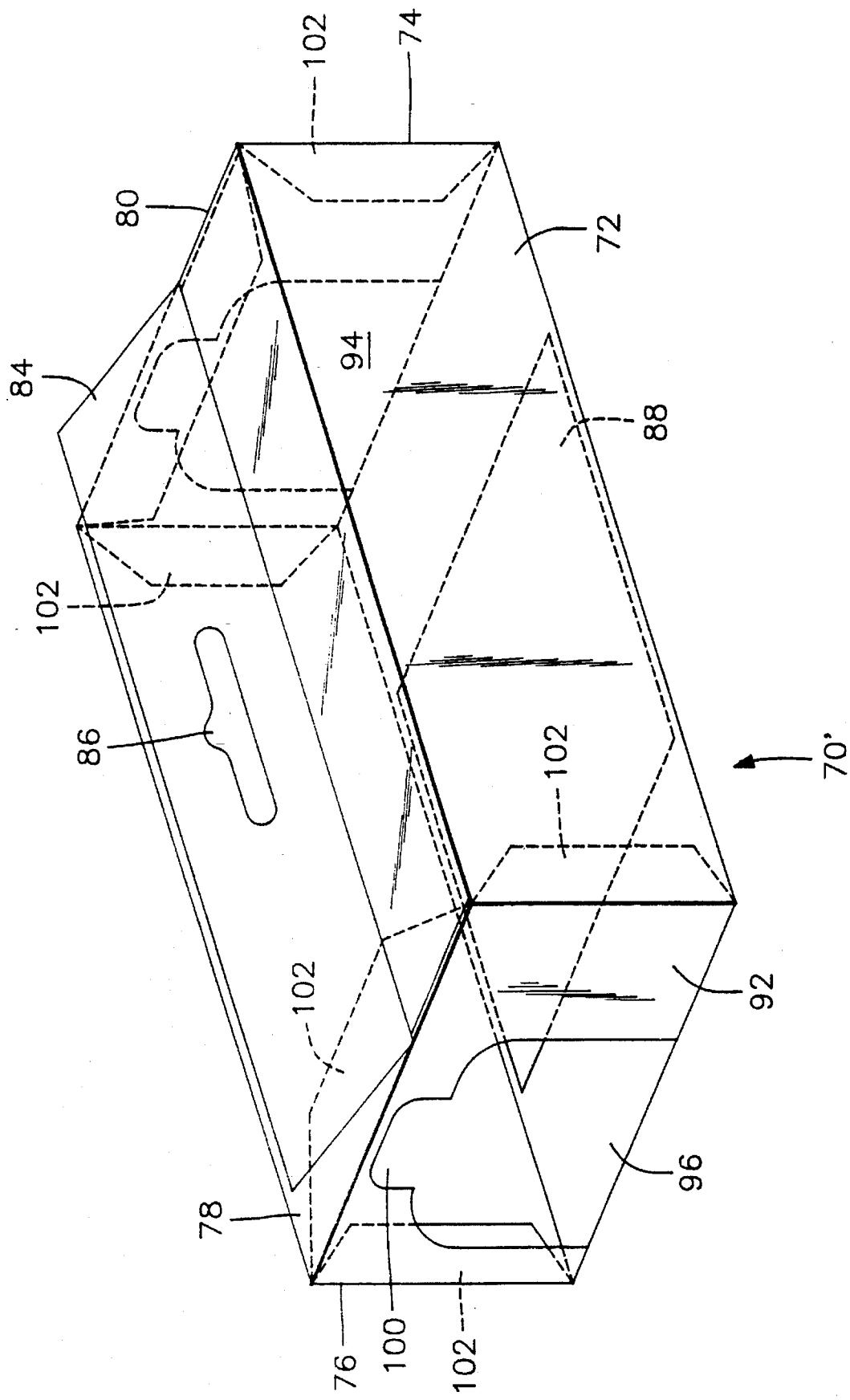

5,477,636

PREASSEMBLED GLUE TRAP

This is a continuation of application Ser. No. 08/136,460, filed Oct. 15, 1993 which was abandoned upon the filing hereof.

BACKGROUND OF THE INVENTION

This invention relates to glue traps of the kind used for trapping rodents such as rats or mice by enticing or otherwise causing the rodent to step onto a layer of very sticky non-drying adhesive from which the rodent cannot then escape. Glue traps of this kind are well-known in the art and exist in numerous different styles and designs for different applications.

One known form of glue trap particularly useful for catching mice is in the form of a tunnel-like structure with an open end or ends and which has an internal glue layer on the floor and possibly also on a side wall. The glue layer may be scented to attract mice. In use, the trap is placed on the floor and along a wall of an infested area and is an effective means for catching mice. When a mouse is trapped, the entire trap is disposed of.

Glue traps of the above kind are commonly made in preassembled form from disposable paperboard stock or the like and are generally packaged in an outer box or wrapper containing one or more of the traps. Accordingly, the outer wrapper is also to be disposed of when the trap or traps are used.

SUMMARY OF THE INVENTION

It is an object of the present invention to provide a preassembled disposable glue trap of the above kind which forms its own packaging, thereby eliminating the need for a separate outer box or wrapper.

Another object of the invention is to provide a preassembled glue trap package in the form of a tunnel-like structure which is totally enclosed for shipping and sale and which has push-in or tear-out portions that provide access openings to within the tunnel when the package is to be converted for use as a trap.

A further object of the invention is to provide a package as described which is made from a specially shaped and folded single blank of paperboard or like stock.

Yet another object of the invention is to provide a package made from a blank as described which includes an integrated suspension means for suspending the trap from a display hook or the like at a point of sale.

In accordance with the invention therefore, at least in a preferred embodiment, a preassembled glue trap package comprises an enclosed tunnel-like structure preferably formed from a folded blank of paperboard or like stock, the tunnel-like structure having a base wall with an internal layer of very sticky non-drying adhesive and end walls closing off opposite ends of the tunnel wherein at least one of the end walls has a push-in or tear-out panel for providing a tunnel access opening in the end wall when the package is to be converted for use as a trap.

Preferably, the tear-out panel may be hinged along the base of the end wall so that it can be folded down and used as a hold-down means for the trap or pushed in to create a path or ramp to the glue surface. Also, the tunnel-like structure is preferably in the form of an elongate parallelopiped with a base wall, side walls, a top wall and end walls with both end walls having a push-in or tear-out panel. One of the other walls may have a laterally or otherwise projecting flap with a suspension aperture.

Thus, the invention provides a glue trap which forms its own packaging and no additional outer box or wrapper is needed. The outer surfaces of the package may be provided with printed matter such as advertising, instructions for use and the like. It is extremely simple to convert the package for use as a trap by pushing in or tearing out the respective panels, which may have integrally formed tabs for this purpose and there is no additional packaging to be disposed of.

Additional features and advantages of the invention will become apparent from the ensuing description and claims read in conjunction with the attached drawings.

BRIEF DESCRIPTION OF DRAWINGS

FIG. 6 is a view similar to FIG. 1 of a modified blank for another glue trap package according to the invention, and FIG. 7 is a view similar to FIG. 5 of a package made from the modified blank.

DESCRIPTION OF PREFERRED EMBODIMENTS

Figure 1:
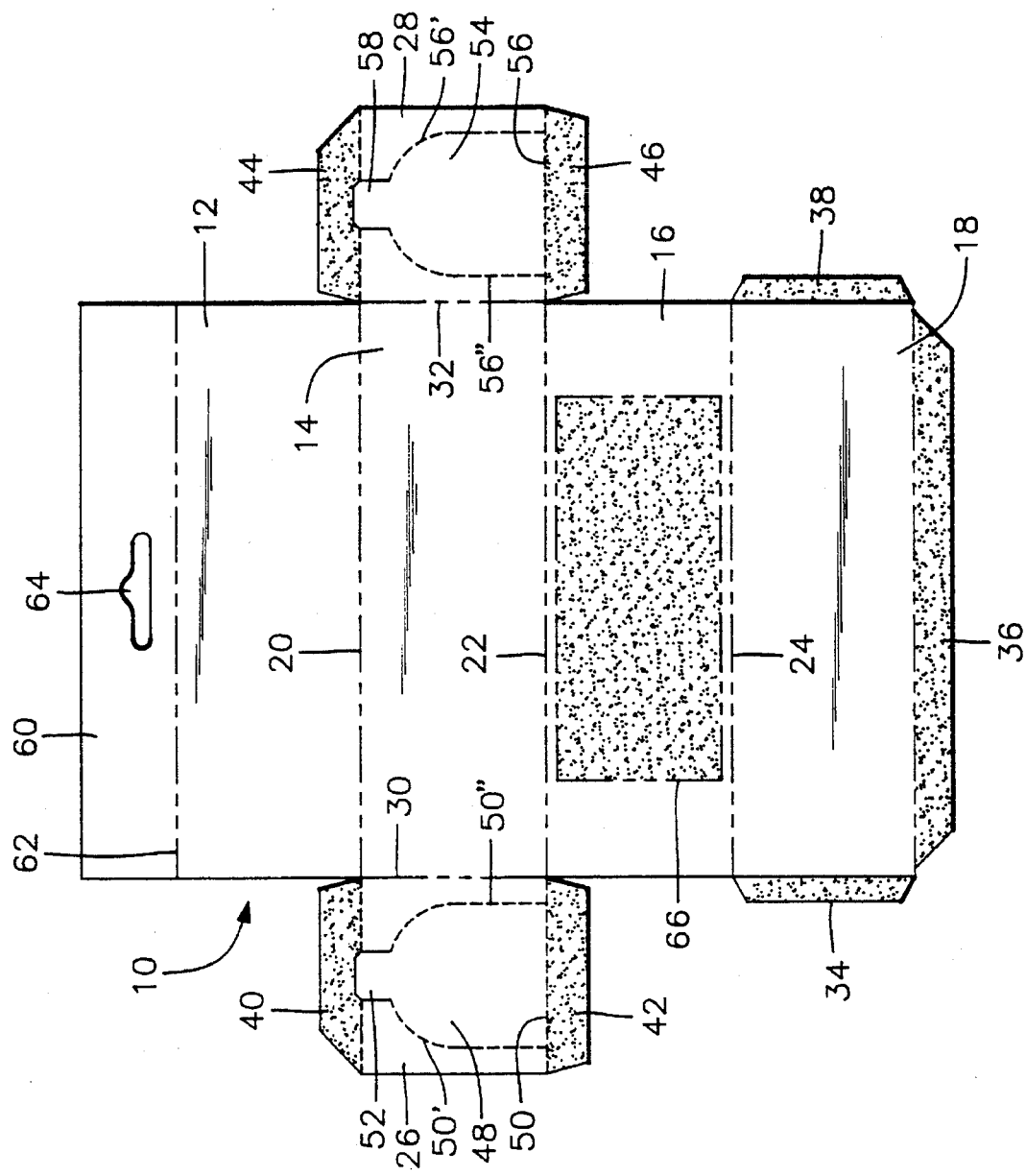
FIG. 1 is a plan view of a paperboard blank for a glue trap package according to the invention.

A paperboard blank 10, FIG. 1, is formed with four contiguous elongate rectangular wall-forming sections for forming into a tunnel-like structure. The wall-forming sections comprise a top wall section 12, side wall sections 14, 18 and a floor or base wall section 16. The sections are separated by respective transverse fold lines 20, 22, 24 scored in the blank. At opposite ends of the side wall section 14 are end wall sections 26, 28 separated from section 14 by fold lines 30, 32. Foldable adhesive tabs 34, 36, 38 are provided around side wall section 18. Similar adhesive tabs 40, 42 and 44, 46 are provided on the top and bottom of end wall sections 26 and 28.

End wall section 26 is formed with a push-in or tear-out panel 48 defined by a perforation line having a horizontal portion 50 along the base of section 26 and upright arched sides 50', 50". The upper ends of the perforation line merge into a pull-tab 52 formed by slitting the blank. Tab 52 protrudes somewhat into adhesive section 40 so that when the blank is formed into a tunnel-like package, FIGS. 2-4, the tab 52 has a slight protrusion, best seen in FIG. 4, to facilitate its manipulation. End wall section 28 is formed with a like tear-out panel 54 defined by perforation line 56, 56', 56" and a tab 58.

Adjacent the top wall section 12 of the blank is a suspension section 60 separated by a fold line 62 and provided with a suspension aperture 64. Base wall section 16 is provided with a layer of very sticky non-drying adhesive 66 of a kind well known in the art for trapping rodents. The side wall sections can also be provided with similar adhesive layers to improve the effectiveness of the product.

Figure 2:
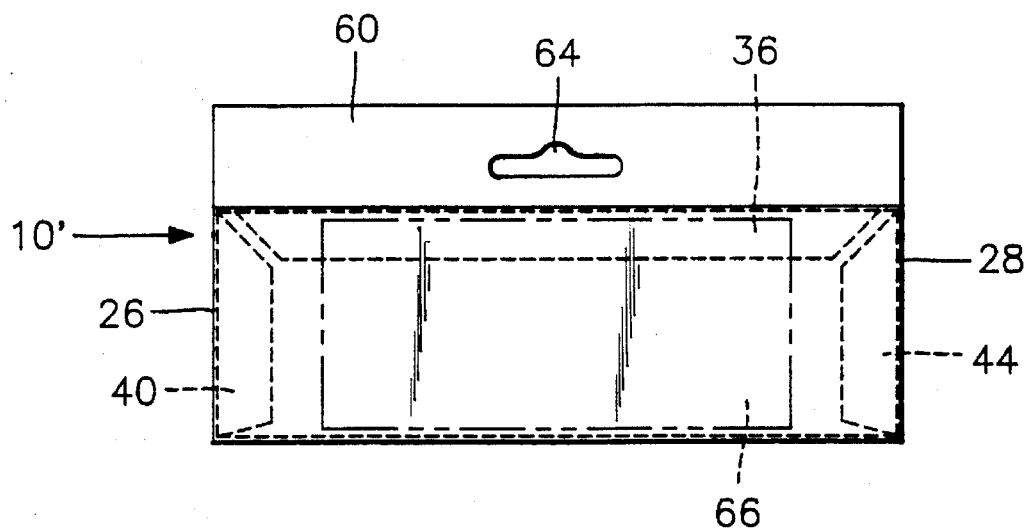
FIGS. 2, 3 and 4 are respectively a plan view, a side elevational view and an end view of a glue trap package formed from the blank.
Figure 3:
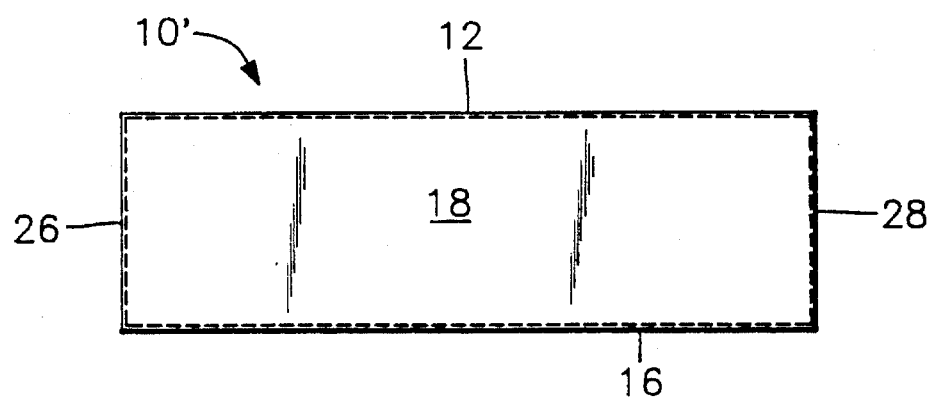
Figure 4:
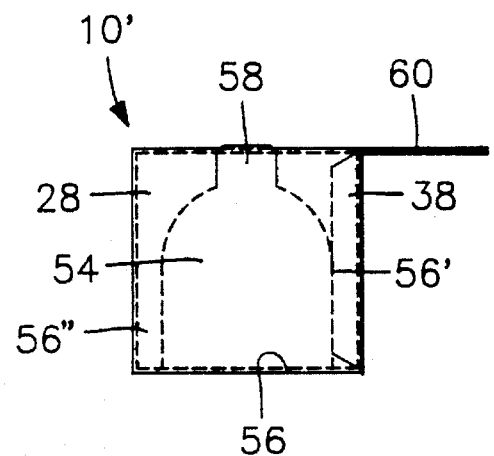

Blank 10 can be formed into a tunnel-like package 10' with a base wall 16, side walls 14, 18, a top wall 12 and end walls 26', as seen in FIGS. 2-4, by folding the various wall-forming sections about their respective fold lines and sticking down the adhesive tabs 34–36. The completed package thus formed comprises a totally enclosed tunnel-like structure with an internal layer of rodent-catching adhesive on the base wall and a projecting suspension section 60 for suspending the package at a point of sale. The outer surfaces of the package are conveniently provided with printed matter, conveniently pre-printed on blank 10, such as advertising and instructions.

Figure 5:
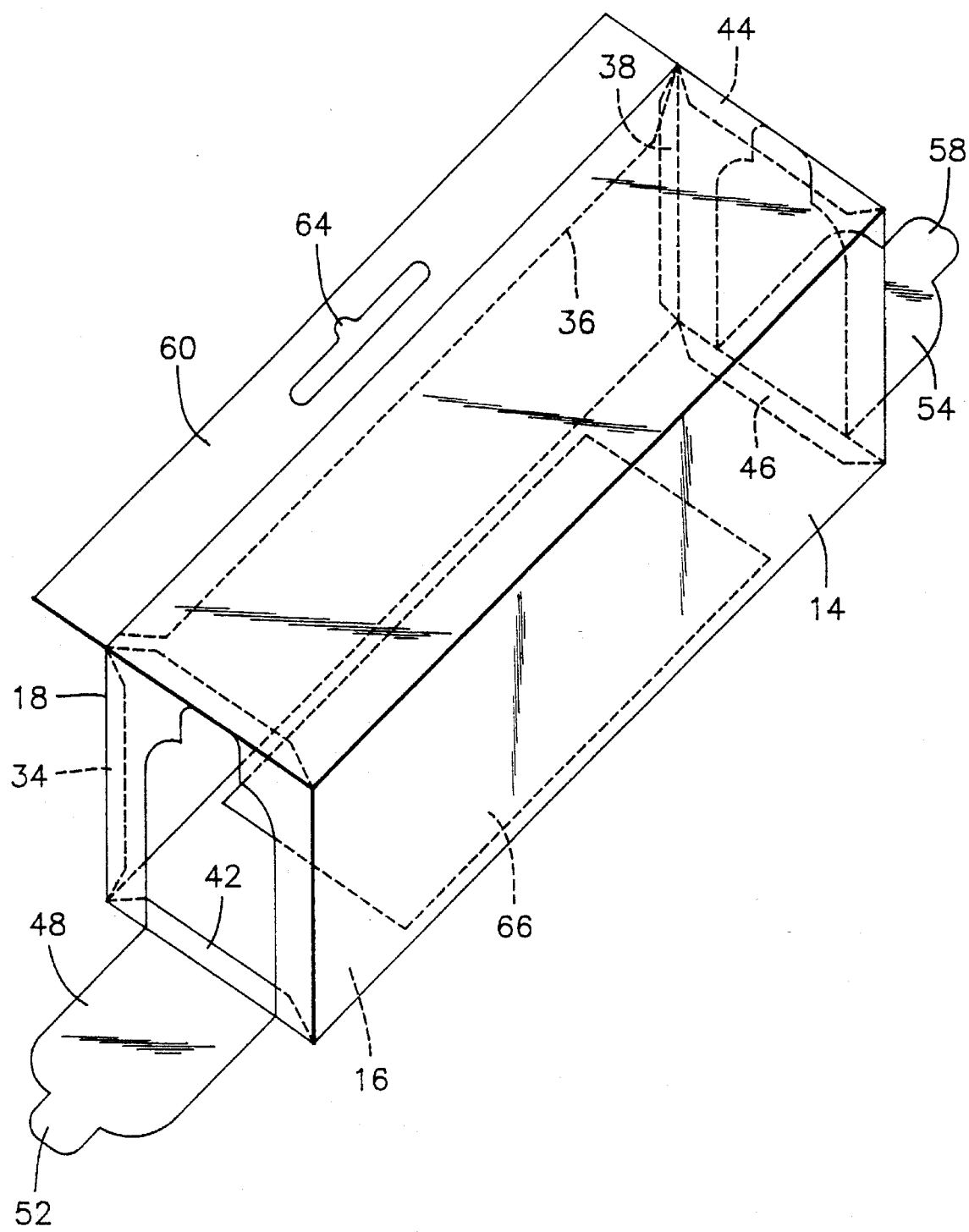
FIG. 5 is an enlarged perspective view of the package converted for use as a glue trap.

To convert the package into a glue trap, it is merely necessary to push-in or tear-out the panels 48 and 54 by gripping tabs 52, 58 and tearing along the respective perforation lines. The panels can be torn out completely or can be hinged down as shown in FIG. 5 about lines 50 and 56 to form hold-down means for the trap. Alternatively, by pushing in panels 48 and 54 and sticking same to the glue surface, a walkway or path to the glue trap surface is created. In either case, the torn out panels thus provide access openings to the tunnel.

FIGS. 6 and 7 show a modified paperboard blank 70 and glue trap package 70' formed therefrom in similar manner to the previous embodiment. The modified package is intended to form a glue trap particularly for catching mice which has a somewhat wider base than that of the previous embodiment and is therefore more difficult to overturn by a mouse when in use along a baseboard of a wall.

The modified blank is again formed with contiguous wall-forming sections including a base wall section 72, side wall section 74, 76 and a top wall section 78. Adjacent side wall section 74 is a cover section 80 provided with lines of adhesive 82, and a suspension section 84 provided with a suspension aperture 86. As previously, the various sections are separated by transverse fold lines scored in the blank. Base wall section 72 is, as previously, provided with a layer of non-drying adhesive 88.

In this embodiment, end wall sections 90, 92 extend from opposite ends of the base wall section 72. The end wall sections are again provided with tear-out or push-in panels 94, 96 with pull-tabs 98, 100 of similar construction to those in the first embodiment but oriented along the base wall panel. Also, it is evident that the panels 94, 96 are positioned more closely to one side of the respective end wall section (and the base wall section) than to the opposite side. This is so that in use, the openings formed by pushing in or tearing out the panels can accommodate mice's tendencies to run along the baseboard of a wall. The package may have printed instructions to position the trap with said one side of the base wall adjacent the baseboard.

The end wall sections are surrounded by fold-in tabs 102 with adhesive lines 104 on undersurface.

It is evident that blank 70 is folded into trap package 70' by folding up the end wall sections 90, 92, folding in the tabs 102, folding up the side wall sections 74, 76 and adhering same to the relevant tabs 102, folding over the top wall section 78 and adhering same to the relevant tabs 102, folding the cover section 80 over the top wall section and adhering same to the top wall section.

The section 84 forms an upper suspension flap or panel which can be used to suspend the package in a vertical orientation at a point of sale, providing more balanced suspension than the laterally extending suspension panel of the previous embodiment.

The package is converted, as previously to a trap by pushing in or tearing out the panels 94, 96. The base wall is wider than in the previous embodiment thereby providing greater stability to being overturned. Because of the asymmetrical positioning of the panels 94, 96 however, the trap openings can still be located close by a wall baseboard to accommodate a mouse's tendency to run along the baseboard.

While only preferred embodiments of the invention have been described herein in detail, the invention is not limited thereby and modifications can be made within the scope of the attached claims.

I claim:

1. A glue trap package comprising an enclosed elongate tunnel-like structure having a base wall with an internal layer of non-drying adhesive for trapping rodents and end walls closing off ends of the structure wherein at least one of the end walls has a push-in or tear-out panel for providing a tunnel access opening in the end wall when the package is to be converted for use as a glue trap, wherein the push-in or tear-out panel is defined by a tear-away perforation line formed in the end wall and wherein the perforation line includes a portion extending along a bottom edge of the end wall about which the panel can be hinged, further wherein the perforation line has opposite upright portions merging into a pull tab for pulling out said panel and the pull tab has a free edge which is located adjacent an upper edge of the end wall.

2. A package as defined in claim 1, wherein the structure is formed by a folded blank of sheet material.

3. A package as defined in claim 1, wherein the perforation line has opposite upright portions merging into a pull tab for pulling out said panel.

4. A package as defined in claim 1, including a suspension panel with a suspension aperture protruding from one wall of the structure.

5. A package as defined in claim 1, wherein said panel is positioned more closely to one side of the end wall than to an opposite side of the end wall.

6. A glue trap package comprising an enclosed elongate tunnel-like structure having a base wall with an internal layer of non-drying adhesive for trapping rodents and end walls closing off ends of the structure wherein at least one of the end walls has a push-in or tear-out panel for providing a tunnel access opening in the end wall when the package is to be converted for use as a glue trap, wherein the push-in or tear-out panel is defined by a tear-away perforation line formed in the end wall and wherein the perforation line includes a portion extending along a bottom edge of the end wall about which the panel can be hinged wherein the perforation line has opposite upright portions merging into a pull tab for pulling out said panel, wherein the pull tab has a free edge protruding from an upper edge of the end wall.

7. A preassembled glue trap package comprising an elongate tunnel-like structure having a base wall, side walls, a top wall and end walls, the tunnel-like structure formed by a folded blank of sheet material, the base wall having an interior layer of non-drying adhesive for trapping rodents, the end walls each having a push-in or tear-out panel for providing a tunnel access opening when the package is to be converted for use as a trap, the base wall, side walls and top wall comprising contiguous elongate sections of said blank folded about respective fold lines between the sections and the end walls comprising further sections of the blank at opposite ends of one of said elongate sections, the end walls being folded about further lines joining the further sections to said one of said elongate sections, wherein the walls of the package are secured together by adhesive tabs extending from selected ones of the walls.

8. A package as defined in claim 7, wherein each tear-out panel is defined by a perforation line with opposite upright portions merging into a pull tab.

9. A package as defined in claim 8, wherein the perforation line has a portion extending along a bottom edge of the respective end wall about which the panel can hinge.

10. A package as defined in claim 7, including a suspension panel with a suspension aperture extending from one wall of the tunnel-like structure.

11. A package as defined in claim 10, wherein the suspension panel extends along the top wall of the structure.

12. A package as defined in claim 7, wherein said push-in or tear-out panels are positioned more closely to one side of the base wall than to an opposite side of the base wall.

13. A preassembled glue trap package comprising an elongate tunnel-like structure having a base wall, side walls, a top wall and end walls, the tunnel-like structure formed by a folded blank of sheet material, the base wall having an interior layer of non-drying adhesive for trapping rodents, the end walls each having a push-in or tear-out panel for providing a tunnel access opening when the package is to be converted for use as a trap, the base wall, side walls and top wall comprising contiguous elongate sections of said blank folded about respective fold lines between the sections and the end walls comprising further sections of the blank at opposite ends of one of said elongate sections, the end walls being folded about further lines joining the further sections to said one of said elongate sections, wherein the walls of the package are secured together by adhesive tabs extending from the end walls and from one of the side walls.

\* \* \* \* \*